(12) United States Patent
Ikebata et al.

(10) Patent No.: US 6,175,651 B1
(45) Date of Patent: *Jan. 16, 2001

(54) ON LINE-CHARACTER RECOGNITION METHOD AND DEVICE

(75) Inventors: Yoshikazu Ikebata; Kazunaga Yoshida; Yutaka Nakashima, all of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/865,856

(22) Filed: May 30, 1997

(30) Foreign Application Priority Data

May 30, 1996 (JP) ................................. 8-136678

(51) Int. Cl.[7] ...................................... G06K 9/00
(52) U.S. Cl. .......................................... 382/187; 382/185
(58) Field of Search ........................... 382/187, 185, 382/217, 202, 227, 209, 190; 400/110, 484

(56) References Cited

U.S. PATENT DOCUMENTS

| | | | |
|---|---|---|---|
| 4,607,386 | * | 8/1986 | Morita et al. ................ 382/185 |
| 4,718,102 | * | 1/1988 | Crane et al. .................. 382/185 |
| 5,588,074 | * | 12/1996 | Sugiyama ..................... 382/209 |
| 5,745,599 | * | 4/1998 | Uchiyama et al. ............. 382/217 |

FOREIGN PATENT DOCUMENTS

| | | | |
|---|---|---|---|
| 55-138171 | 10/1980 | (JP) | ................ G06K/9/30 |
| 60-68484 | 4/1985 | (JP) | ................ G06K/9/62 |
| 60-237580 | 11/1985 | (JP) | ................ G06K/9/62 |
| 62-164183 | 7/1987 | (JP) | ................ G06K/9/62 |
| 62-269089 | 10/1987 | (JP) | ................ G06K/9/62 |
| 1-136288 | 5/1989 | (JP) | ................ G06K/9/62 |
| 1-56889 | 6/1989 | (JP) | ................ G06K/9/62 |
| 4-336686 | 11/1992 | (JP) | ................ G06K/9/62 |

OTHER PUBLICATIONS

*Papers of the Institute of Electronics, Information and Communication Engieneers,* Feb. 1991, D–II, vol. J74–D–II, No. 2, pp. 166–174, "Application of Fuzzy Logic in an On–line Handwritten Character Recognition Method".

* cited by examiner

Primary Examiner—Jose L. Couso
Assistant Examiner—Anh Hong Do
(74) Attorney, Agent, or Firm—Sughrue, Mion, Zinn, Macpeak & Seas, PLLC

(57) ABSTRACT

An on-line character recognition method is disclosed that recognizes inputted characters on-line by finding distance between strokes for patterns in stroke units of inputted characters and patterns in stroke units for each reference stroke. Reference patterns and inputted character patterns are each divided and represented as stroke shape patterns that indicate the shapes of strokes and stroke position patterns that indicate the position or size of strokes. Interstroke shape distances corresponding to each stroke shape pattern and inter-stroke position distances corresponding to each stroke position pattern are found, following which the inter-stroke distance is found based on the inter-stroke shape distances and the inter-stroke position distances.

11 Claims, 4 Drawing Sheets

ON LINE-CHARACTER RECOGNITION METHOD AND DEVICE

BACKGROUND OF THE INVENTION

1. Field of the Invention

The present invention relates to an on-line character recognition method and device, and more particularly to an on-line character recognition method and device that recognizes inputted characters on-line by finding inter-stroke distance in the patterns in stroke units of inputted characters and reference patterns in stroke units that are produced in advance by quantizing the strokes of target characters.

2. Description of the Related Art

Japanese Patent Publication No. 38351/93 (Hereinbelow referred to as Reference 1) discloses one example of an on-line character recognition device that recognizes characters on-line by using information regarding strokes, a stroke being a continuous pen track from the contact of a pen with a tablet until separation of the pen from the tablet.

In this on-line character recognition device, patterns in stroke units are first found from inputted characters, and then, using a stroke code book composed of assemblages of reference patterns prepared in advance by quantizing the strokes of target characters, inter-stroke distances are found with respect to each of the reference patterns in the stroke code book. Next, inter-character distances are found by adding each of the obtained inter-stroke distances in accordance with a character dictionary in which characters are represented by code strings for each reference pattern within the stroke code book, and the character giving the smallest distance is taken as the recognition result. This method allows a reduction in both the amount of memory and number of calculations as compared with a case in which inter-stroke distances for all strokes are calculated without quantizing the strokes of target characters.

The method described in the paper "Application of Fuzzy Logic in an On-line Handwritten Character Recognition Method" in the Papers of the Institute of Electronics, Information and Communication Engineers (February 1991, D-II, Vol. J74-D-II, No. 2, pp. 166–174) (Hereinafter referred to as Reference 2) seeks the degree of similarity between the shape of each stroke of an inputted character and each of a number of basic stroke shape patterns prepared in advance. Characters are recognized using a recognition dictionary of character units described in terms of fuzzy propositions using this degree of similarity and each of various features. The character dictionary may take a form in which, for example, every character is described in terms of fuzzy propositions using the various features such as stroke shape, stroke length, stroke direction, stroke position, and number of stroke; two examples being "the first line is close to representative stroke pattern No. 1 or representative stroke pattern No. 2" and "the beginning of the second line is close to and below the beginning of the first line."

In the prior-art device described in Reference 1, the patterns of stroke units are quantized without alteration and therefore include information on stroke shape and position. Patterns of differing position but of similar shape are therefore prepared as different stroke unit patterns, and this prior-art method therefore necessitates a voluminous stroke code book, a huge amount of memory for maintaining the stroke code book, and numerous calculations for finding inter-stroke distances.

In the method described in Reference 2, there is the problem that a recognition dictionary must be prepared relating to each of different characteristics for every character. The production of these recognition dictionaries requires operator input for each individual character, and therefore necessitates a great deal of labor. Finally, there is the problem that control of the recognition process requires a complicated process of solving fuzzy propositions for every character, and this type of process is difficult to realize a high-speed and repetitive process by hardware.

SUMMARY OF THE INVENTION

The object of the present invention is to provide an on-line character recognition method and device that allow a great reduction in the amount of required memory, the number of computations, and number of steps required for preparing a recognition dictionary.

To achieve the above-described objects, the present invention provides an on-line character recognition method that includes the steps of:

inputting the stroke patterns of an inputted character;

finding a stroke shape pattern that indicates stroke shape and a stroke position pattern that indicates stroke position or size for each inputted stroke pattern;

finding inter-stroke shape distance, which is the distance between each stroke shape pattern of the inputted character and a stroke shape pattern obtained in advance with respect to the stroke pattern of a reference character, and inter-stroke position distance, which is the distance between each stroke position pattern of the inputted character and a stroke position pattern obtained in advance with respect to the stroke pattern of a reference character; and finding inter-stroke distance between strokes of each target character and strokes of the inputted character based on the inter-stroke shape distances and the inter-stroke position distances, and taking as the recognition result for the inputted character the target character corresponding to the smallest inter-stroke distance.

In addition, the present invention provides an on-line character recognition device that includes:

pattern detection means for inputting stroke patterns of an inputted character, and finding from each stroke pattern a stroke shape pattern indicating stroke shape and a stroke position pattern indicating stroke position or size;

inter-stroke shape distance calculation means for finding inter-stroke shape distance, which is the distance between each of the stroke shape patterns and stroke shape patterns obtained in advance with respect to stroke patterns of reference characters;

inter-stroke position distance calculation means for finding inter-stroke position distance, which is the distance between each of the stroke position patterns and stroke position patterns obtained in advance with respect to stroke patterns of reference characters; and matching means for finding inter-stroke distance between strokes of each target character and the strokes of the inputted character based on the inter-stroke shape distance and the inter-stroke position distance and taking as the recognition result for the inputted character the target character having the smallest inter-stroke distance.

In an on-line character recognition that takes strokes as units, strokes can be represented by dividing between patterns corresponding to shape and patterns corresponding to the position of strokes, and information common to various characters can therefore be compactly organized by preparing code books for each pattern.

This arrangement allows processing by simple distance calculations, thereby allowing a reduction in the number of calculations and the amount of memory, and moreover, allowing a simplification of the production of a dictionary.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
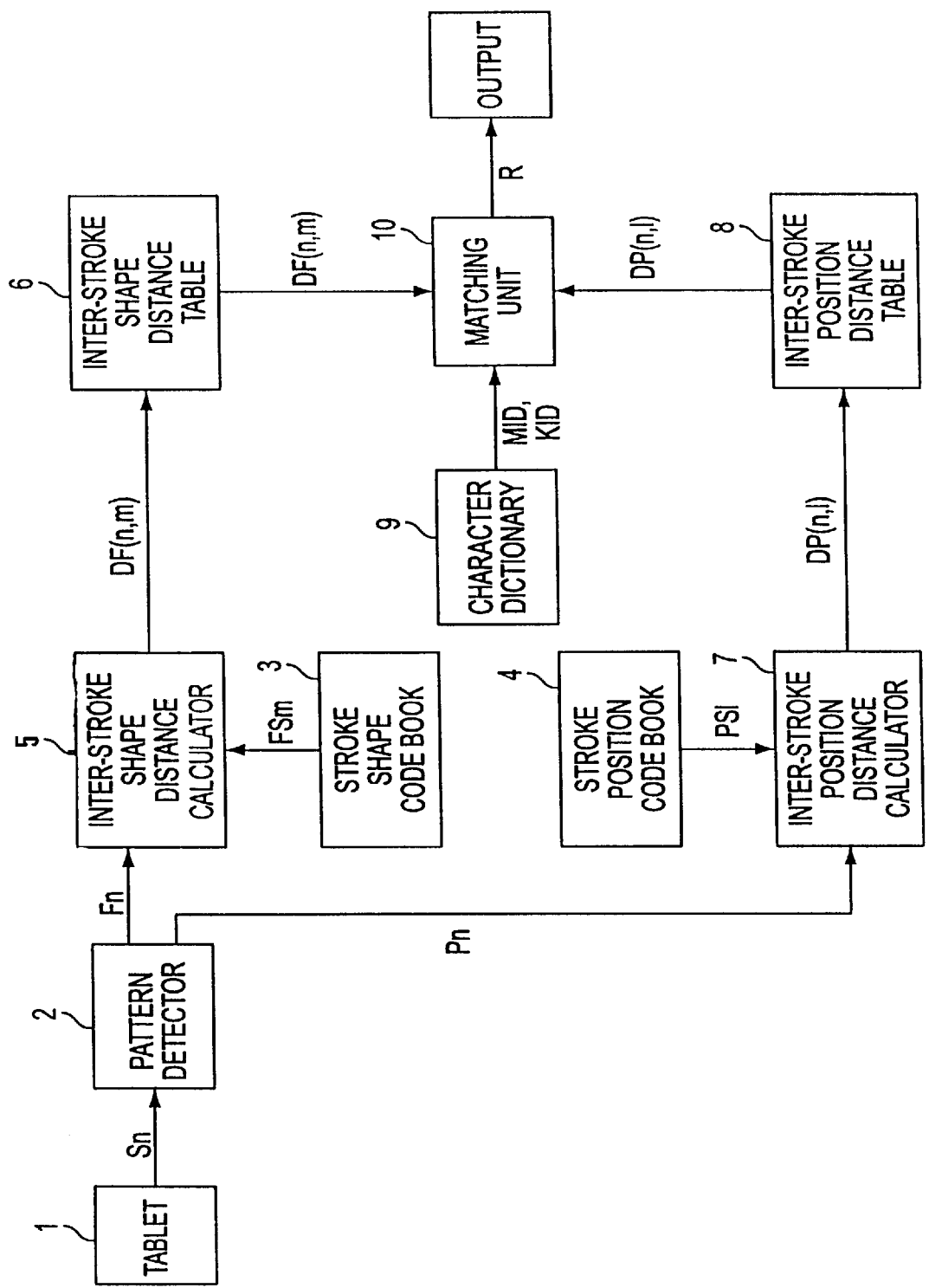
FIG. 1 shows the construction of an on-line character recognition device according to the first embodiment of the present invention.

Referring to FIG. 1, the first embodiment of an on-line character recognition device according to the present invention consists of tablet 1, pattern detector 2, stroke shape code book 3, stroke position code book 4, inter-stroke shape distance calculator 5, inter-stroke shape distance table 6, inter-stroke position distance calculator 7, inter-stroke position distance table 8, character dictionary 9, and matching unit 10.

Tablet 1 is an input device and outputs for every stroke a series of coordinate points of fixed time intervals on the stroke as the stroke pattern, one stroke being the track from initial contact of an input pen with tablet 1 to separation of the pen from tablet 1.

Pattern detector 2 inputs each stroke pattern outputted from tablet 1, finds from the stroke pattern $S_n$ (n=1, 2, ..., N) (N being the number of strokes constituting input character A) that constitutes input character A stroke position pattern $P_n$ (n=1, 2, ..., N) that indicates the position of a stroke, and extracts the stroke shape pattern $F_n$ (n=1, 2, ..., N) that indicates the shape of a stroke.

Stroke shape code book 3 and stroke position code book 4 include stroke shape pattern Fn and stroke position pattern $P_n$, respectively, obtained from data for all target characters gathered in advance; and are each prepared in advance as code books for target characters in accordance with a code book preparation method that employs clustering such as described in Reference 1, and are, for example, constructed on an auxiliary memory device.

Inter-stroke shape distance calculator 5 finds the distance between stroke shape pattern Fn and reference stroke shape pattern $FS_m$ in stroke shape code book 3, and stores the result as inter-stroke shape distance DF (n, m) in inter-stroke shape distance table 6.

Inter-stroke shape distance table 6 is a table in which inter-stroke shape distances DF(n, m) found by inter-stroke shape distance calculator 5 are stored, and may be constructed on an auxiliary memory device.

Inter-stroke position distance calculator 7 finds the Euclidean distance between reference stroke position pattern $PS_l$ (l=1, 2, ..., L) and stroke position pattern Pn in stroke position code book 4 and stores the result in inter-stroke position distance table 8 as inter-stroke position distance DP (n, l).

Inter-stroke position distance table 8 is a table in which inter-stroke position distances DP (n, l) found by inter-stroke position distance calculator 7 are stored, and may be constructed on an auxiliary memory device.

Character dictionary 9 is a dictionary of characters expressed in terms of code numbers corresponding to each of stroke shape code book 3 and stroke position code book 4, and may be constructed on an auxiliary memory device.

Matching unit 10 finds inter-character distances between target characters and inputted characters using distance values stored in inter-stroke shape distance table 6 and inter-stroke position distance table 8 according to character dictionary 9 and recognizes characters.

Each of the above-described blocks, i.e., pattern detector 2, inter-stroke shape distance calculator 5, inter-stroke position distance calculator 7, and matching unit 10, may be constructed as a functional means realized by software incorporated within a data processor.

Figure 2:
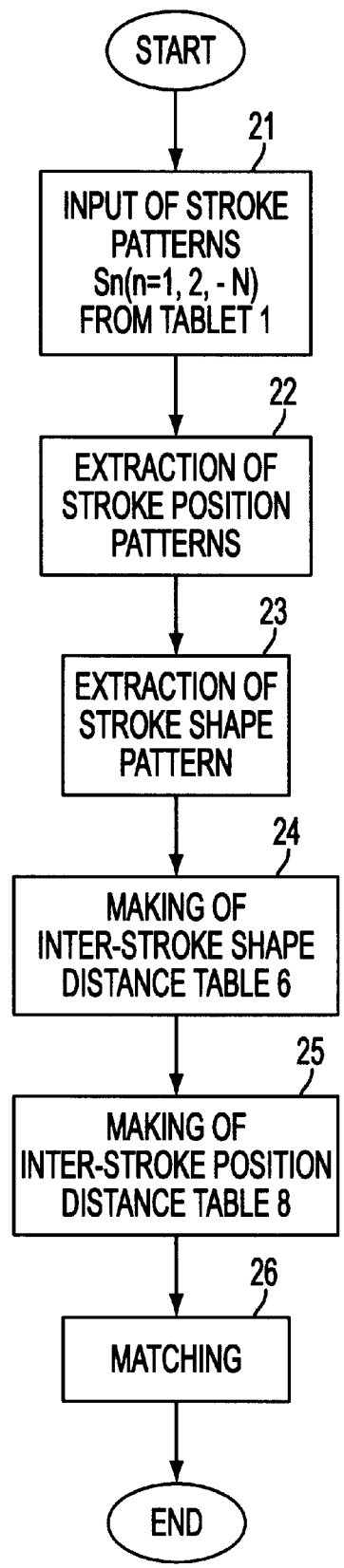
FIG. 2 is a flow chart showing the processing sequence of the on-line character recognition device shown in FIG. 1.

The operation of the on-line character recognition device according to this embodiment will next be explained with reference to the flow chart of FIG. 2.

First, in Step 21, tablet 1 outputs for every stroke the track of an input pen from its contact with tablet 1 until its removal from tablet 1 as one stroke and the series of coordinate points at fixed time intervals on the stroke as one stroke pattern. Pattern detector 2 inputs these stroke patterns as stroke pattern $S_n$ (n=1, 2, ..., N) where N is the number of strokes making up inputted character A.

In Step 22, pattern detector 2 obtains from stroke pattern Sn the stroke position pattern $P_n$ (n=1, 2, ..., N) which represents the stroke position. If the position and size of inputted character A are normalized in advance, the coordinates of the center of gravity of the stroke $(gx_n, gy_n)$ can be taken as the stroke position pattern $P_n$ and found from the following equation (1) using the coordinate points $\{x_n(i), Y_n(i)\}$, (i=1, 2, ..., I; where I is the number of coordinate points making up stroke pattern $S_n$) of the stroke pattern Sn:

$$(GX_n, GX_n) = \frac{1}{I}\sum_{i=1}^{I}(X_n(i)Y_n(i)) \tag{1}$$

Next, in Step 23, pattern detector 2 finds stroke shape pattern $F_n$(n=1, 2, ..., N), which represents the shape of the stroke, from stroke pattern Sn. This stroke shape pattern $F_n$ is taken as the inclination $D_n(i)$ of segments joining adjacent coordinate points and is found from the following equation:

$$D_{n(i)} = \tan^{-1}\left(\frac{Y_{n(i+1)} - Y_{n(i)}}{X_{n(i+1)} - X_{n(i)}}\right) \tag{2}$$

The processing of inter-stroke shape distance calculator 5 is executed in Step 24. The inter-stroke shape distance for the stroke shape pattern Fn found by pattern detector 2 is obtained for every stroke pattern Sn using stroke shape code book 3 through the application of, for example, DP matching such as described in the paper entitled "On-line handwritten character recognition through stack DP matching" in Papers of The Institute of Electronics, Information and Communication Engineers (1983, PRL 83-29, pp. 1–7). This stroke shape code book 3 stores stroke shape pattern $FS_m$ (m=1, 2, ..., M) of representative strokes of target characters (where m is a code number).

The distance between the stroke shape pattern $F_n$ of the inputted character and the stroke shape patterns $FS_m$ of these representative strokes is found, and the result is stored in inter-stroke shape distance table 6 as inter-stroke shape distance DF(n, m).

The processing of inter-stroke position distance calculator 7 is executed in Step 25. In the same way as for inter-stroke shape distance calculator 5, the inter-stroke position distance for stroke position pattern $P_n$ found by pattern detector 2 is found by using stroke position code book 4. This stroke position code book 4 stores stroke position patterns $PS_l$ (l=1, 2, ..., L) (where l is a code number) of representative strokes of target characters. The Euclidean distance between the stroke position pattern $P_n$ of an inputted character and the stroke position pattern PSl of these representative strokes is found, and the result is stored in inter-stroke position distance table 8 as inter-stroke position distance DP(n, l).

In Step 26, matching unit 10 finds inter-character distances by referring to character dictionary 9 and carries out character recognition by using inter-stroke shape distances DF(n, m) in inter-stroke shape distance table 6 and inter-stroke position distances DP(n, l) in inter-stroke position distance table 8. In character dictionary 9 comprising character code identifiers are stored in advance both the code numbers MID(t, u) (u=1, 2, ..., Ut; where Ut is the number of strokes making up Bt) used in stroke shape code book 3 for reference stroke shape patterns that make up target characters Bt (t=1, 2, ..., T; where T is the number of target characters), and code numbers KID(t, u) used in stroke position code book 4 for reference stroke position patterns that make up target characters Bt. Matching unit 10 finds distance D (A, Bt) for every target character Bt based on these code numbers, the inter-stroke shape distance DF(n, m), and the inter-stroke position distance DP(n, l) in accordance with the following equation (3), and takes the target character corresponding to the smallest value as the recognition result R for inputted character A.

$$D(A, B_t) = \sum_{n=1}^{N} \{DF(n, MID(t, n)) + DP(n, KID(t, n))\} \quad (3)$$

In the on-line character recognition device of this embodiment, stroke information is divided between and represented by the shape of a stroke unit regardless of its stroke position or size within the character, and the position and/or size occupied by a stroke within the character, thereby affording a still greater reduction in the amount of memory and the number of computations. In other words, features constituted by shape and position and/or size are extracted from all of strokes appearing in target characters, and each of these patterns are then quantized and taken as representative stroke shape patterns and representative stroke position patterns. A character is represented by the combination of its representative stroke shape patterns and representative stroke position patterns. As a result, not only can a character be represented with a smaller amount of memory, but computation can also be executed at higher speeds.

Figure 3:
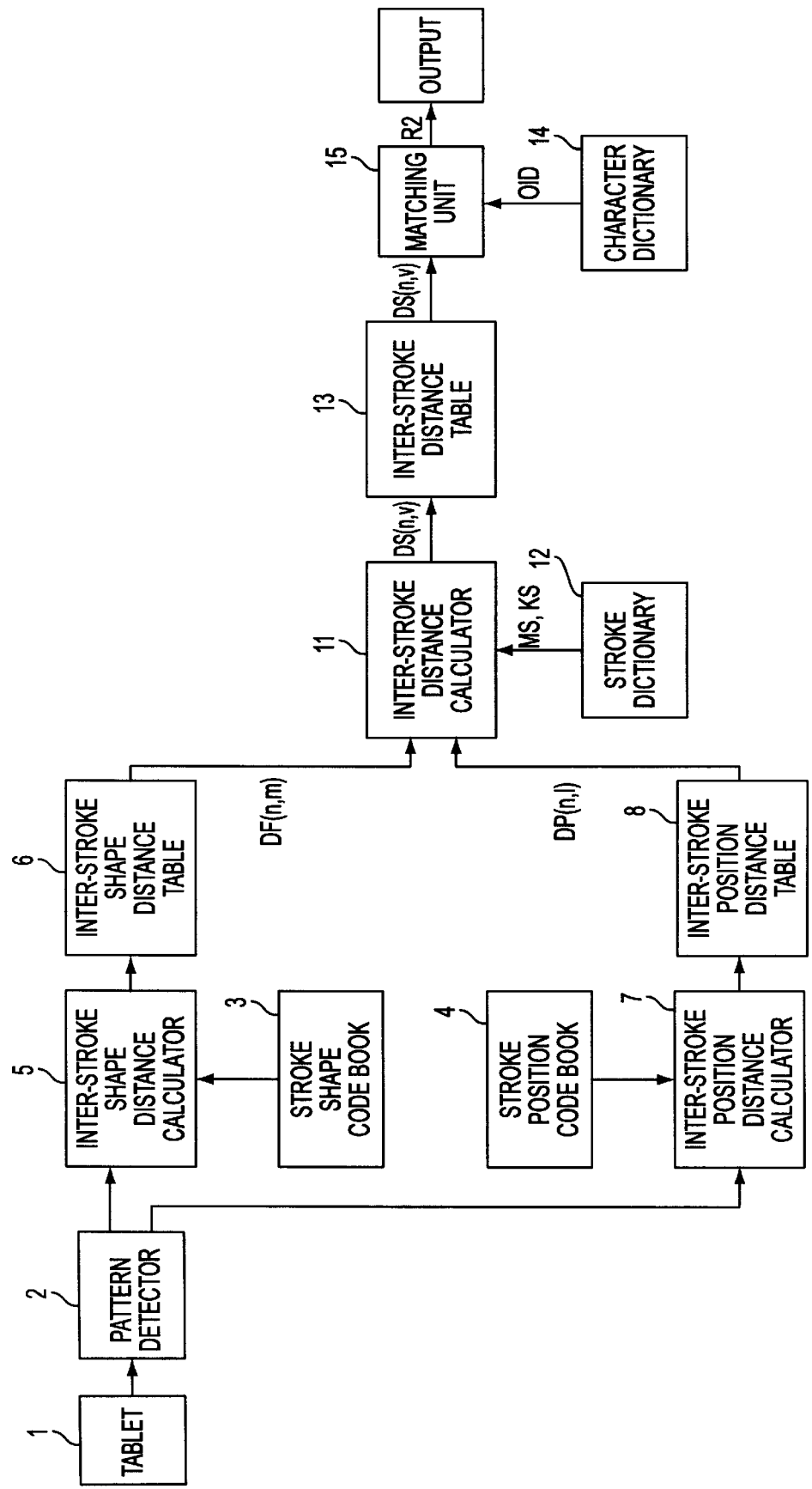
FIG. 3 shows the construction of an on-line character recognition device according to the second embodiment of the present invention.

Referring to FIG. 3, the on-line character recognition device according to the second embodiment of the present invention tablet 1, pattern detector 2, stroke shape code book 3, stroke position code book 4, inter-stroke shape distance calculator 5, inter-stroke shape distance table 6, inter-stroke position distance calculator 7, and inter-stroke position distance table 8, these components being identical to corresponding components of the on-line character recognition device of the first embodiment; and in addition includes inter-stroke distance calculator 11, stroke dictionary 12, inter-stroke distance table 13, character dictionary 4, and matching section 15.

The matching unit of the first embodiment shown in FIG. 1 referred to the data of inter-stroke shape distance table 6 and inter-stroke position distance table 8. In contrast, the on-line character recognition device of this embodiment differs from that of the first embodiment in that inter-stroke distance calculator 11 refers to stroke dictionary 12, finds the inter-stroke distances from the distance values in inter-stroke shape distance table 6 and inter-stroke position distance table 8, and stores the result in inter-stroke distance table 13; and in that matching section 15 refers to inter-stroke distance table 13 which stores these distance values. Moreover, character dictionary 14 differs from character dictionary 9 of the first embodiment in that it stores code numbers OID(t, u) of inter-stroke distance table 13 of stroke patterns making up target characters Bt.

In accordance with the following equation (4), inter-stroke distance calculator 11 finds inter-stroke distance DS(n, v) for every stroke from code numbers MS(v) (v=1, 2, ..., V; where V is the number of representative strokes) and KS(v) stored in stroke dictionary 12, inter-stroke shape distance DF(n, m) in inter-stroke shape distance table 6, and inter-stroke position distance DP(n, l) in inter-stroke position distance table 8, and stores the result in inter-stroke distance table 13.

$$DS(n, v) = DF(n, MS(v)) + DP(n, KS(v)) \quad (4)$$

Stroke dictionary 12 is a dictionary in which are stored, for example, the code numbers MS(v) of the representative strokes used in stroke shape code book 3 and code numbers KS(v) used in stroke position code book 4 of reference stroke position patterns, and, for example, may be constructed on an auxiliary memory device.

Inter-stroke distance table 13 is a table that stores inter-stroke distance DS(n, v) found at inter-stroke distance calculator 11, and, for example, may be constructed on an auxiliary memory device.

Character dictionary 14 stores the code numbers OID (t, u) (u=1, 2, ..., Ut; where Ut is the number of strokes making up Bt) of stroke patterns making up target characters Bt.

Matching unit 15 finds distances D2 (A, Bt) for every target character Bt based on the inter-stroke distances DS(n, v) stored in inter-stroke distance table 13 and the code numbers OID(t, u) stored in character dictionary 14 in accordance with the following equation (5), and determines the target character for which the values are smallest is determined as the recognition result R2 corresponding to inputted character A.

$$D_2(A, B_t) = \sum_{n=1}^{N} DS(n, v) \quad (5)$$

In the on-line character recognition device of this embodiment, a character can be represented by one type of code for stroke type, and as a result, characters can be represented with less memory and computation can be carried out at higher speeds in cases in which there are many target characters.

Figure 4:
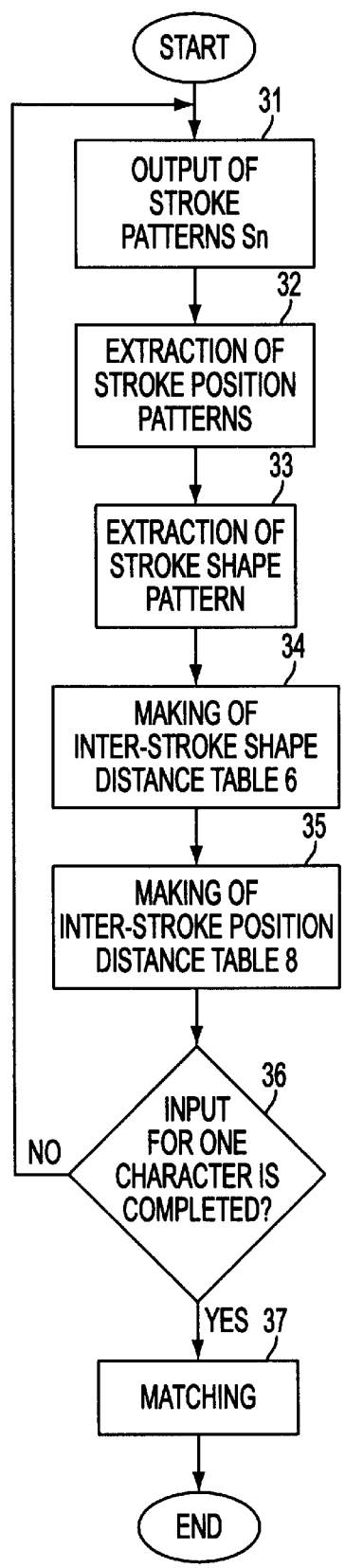
FIG. 4 is a flow chart showing the processing sequence of the on-line character recognition device shown in FIG. 3.

FIG. 4 is a flow chart showing the sequence of processes of the on-line character recognition device of a third embodiment of the present invention. In the first and second embodiments, a series of processes were carried out in character units, but processing in this embodiment is such that inter-stroke shape distance calculation and inter-stroke position distance calculation is performed for every stroke inputted, as shown in FIG. 4. Other processes are equivalent to those of the first and second embodiments, and explanation is therefore here omitted.

In these embodiments, moreover, the coordinates of the center of gravity of a stroke in one character are used as stroke position pattern Pn, but various other characteristics that distinguish the position within a character such as the coordinate values of both end-points of a stroke may also be employed. In addition, the size of a stroke may be used as the stroke position pattern Pn. A variety of characteristics that represent the size of a stroke may be used as the size of the stroke, including the vertical or horizontal length of a stroke, or the radius Rn of a circle taking as center the center of gravity of a stroke as shown in equation (6) below. In addition, the characteristics of position and size may be used separately or in combination.

$$Rn = \left\{ \sum_{i=1}^{I} (x_{n(i)}^2 + y_{n(i)}^2) \right\} / I \quad (6)$$

Although Euclidean distance was used as the value of inter-stroke position distance in the above-described embodiments, city—block distances or various other inter-pattern distance standards may also be used.

Furthermore, although the above-described embodiments find inter-stroke shape distance through DP matching using the inclination of line segments connecting coordinate point to coordinate point as the characteristic of stroke shape, other methods of finding distances may also be used. For example, other characteristic amounts or distance scales indicating various stroke shapes such as described in the paper "On-line handwritten kanji recognition for simplified or cursive characters in which writing rules are relaxed" on pages 115–133 of the Dec. 5, 1983 edition of Nikkei Electronics may be used, or a method may be used in which distances are found by quantizing the direction of segments joining coordinate point to coordinate point in 8 directions or 16 directions.

While preferred embodiments of the present invention have been described using specific terms, such description is for illustrative purposes only, and it is to be understood that changes and variations may be made without departing from the spirit or scope of the following claims.

What is claimed is:

1. An on-line character recognition method comprising the steps of:
   inputting a character, said character having one or more stroke patterns;
   for each stroke of said one or more stroke patterns:
      detecting a respective stroke shape pattern for said stroke pattern,
      detecting a respective stroke position pattern for said stroke pattern,
      calculating a plurality of inter-stroke shape distances, said inter-stroke shape distances being the distances between said stroke shape pattern and a plurality of target character stroke shape patterns stored by a plurality of stroke shape code numbers in a stroke shape code book,
      storing said inter-stroke shape distances in a shape distance table, said shape distance table including a stroke number and a stroke shape code number for each target character stroke shape pattern,
      calculating a plurality of inter-stroke position distances, said inter-stroke position distances being the distances between said stroke position pattern and a plurality of target character stroke position patterns stored by a plurality of stroke position code numbers in a stroke position code book,
      storing said inter-stroke position distances in a position distance table, said position distance table including a stroke number and a stroke position code number for each target character stroke position pattern;
   providing a character dictionary comprising a plurality of target characters and associated character code identifiers, said character code identifiers corresponding to the stroke shape code numbers and stroke position code numbers for referencing said stroke shape patterns of target characters and said stroke position patterns of target characters respectively, each of said target characters having one or more strokes, each said stroke consisting of one said stroke shape pattern and one said stroke position pattern;
   calculating a plurality of inter-character distances by using said inter-stroke shape distances stored in said shape distance table and said inter-stroke position distances stored in said position distance table, said inter-character distances being the distances between said inputted character and said plurality of target characters stored in said character dictionary; and
   selecting the one of said plurality of target characters, from the character dictionary, which corresponds to the smallest inter-character distance of said plurality of inter-character distances.

2. A method according to claim 1, wherein said detecting of said stroke position pattern comprises determining the coordinate values of only the center of gravity of said stroke, and said calculating of said plurality of inter-stroke position distances uses, from said stroke position pattern, only said center of gravity.

3. A method according to claim 1, wherein said detecting of said stroke position pattern comprises determining the coordinate values of only the end points of said stroke; and said calculating of said plurality of inter-stroke position distances uses, from said stroke position pattern, only said end points.

4. A method according to claim 1, wherein said detecting of said stroke position pattern comprises determining only the size of said stroke, and said calculating of said plurality of inter-stroke position distances uses, from said stroke position pattern, only said size of said stroke.

5. A method according to claim 1, wherein said detecting of said stroke shape pattern comprises determining only the inclination of segments joining adjacent coordinate points of said stroke, and said calculating of said plurality of inter-stroke shape distances uses, from said stroke shape pattern, only said inclination of segments.

6. A method according to claim 1, wherein said calculating of said inter-stroke position distance comprises determining only the Euclidean distance between said stroke position pattern and the stroke position pattern of a reference character.

7. An on-line character recognition method comprising the steps of:
   inputting a character, said character having one or more stroke patterns;
   for each of said stroke patterns:
      detecting a stroke shape pattern for said stroke pattern,
      detecting a stroke position pattern for said stroke pattern, calculating a plurality of inter-stroke shape distances, said inter-stroke shape distances being the distances between said stroke shape pattern and a plurality of target character stroke shape patterns stored by a plurality of stroke shape code numbers in a stroke shape code book, storing said inter-stroke shape distances in a shape distance table, said shape distance table including a stroke number and a stroke shape code number for each target character stroke shape pattern, calculating a plurality of inter-stroke position distances, said inter-stroke position distances being the distances between said stroke position pattern and a plurality of target character stroke position patterns stored by a plurality of stroke position code numbers in a stroke position code book, and storing said inter-stroke position distances in a position distance table, said position distance table including a stroke number and a stroke position code number for each target character stroke position pattern;

providing a stroke dictionary consisting of a plurality of stroke code identifiers;

calculating a plurality of inter-stroke distances;

storing said inter-stroke distances in an inter-stroke distance table;

providing a character dictionary comprising a plurality of target characters and associated character code identifiers, said character code identifiers corresponding to the stroke shape code numbers and stroke position code numbers for referencing said stroke shape patterns of target characters and said stroke position patterns of target characters respectively, each of said target characters having one or more strokes, each said stroke consisting of one said stroke shape pattern and one said stroke position pattern;

calculating a plurality of inter-character distances from said inter-stroke distances stored in said inter-stroke distance table and said character code identifiers stored in said character dictionary; and selecting the one of said plurality of target characters, from the character dictionary, which corresponds to the smallest inter-character distance of said plurality of inter-character distances.

8. A method according to claim 7, wherein said inter-stroke distances are calculated as the sum of the inter-stroke shape distances and the inter-stroke position distances corresponding to said stroke code identifier.

9. An on-line character recognition device for producing a recognition result, said device comprising:

an input device for inputting a stroke pattern, said stroke pattern being associated with an inputted character;

a pattern detector for processing said stroke pattern and detecting a stroke shape pattern indicating a stroke shape and a stroke position pattern indicating one or more of a stroke position and a stroke size;

a stroke shape code book, said stroke shape code book including a plurality of target character stroke shape patterns and a plurality of stroke shape code numbers;

a stroke position code book, said stroke position code book including a plurality of target character stroke position patterns and a plurality of stroke position code numbers;

a stroke shape distance calculator calculating a set of inter-stroke shape distances for said inputted character, said inter-stroke shape distances each representing a difference between said stroke shape pattern of said inputted character and said target character stroke shape patterns;

a stroke position distance calculator calculating a set of inter-stroke position distances for said inputted character, said inter-stroke position distances each representing a difference between said stroke position pattern of said inputted character and said target character stroke position patterns;

a stroke shape distance table for storing said set of inter-stroke shape distances;

a stroke position distance table for storing said set of inter-stroke position distances;

a character dictionary comprising a plurality of target characters and associated character code identifiers, said character code identifiers corresponding to the stroke shape code numbers and stroke position code numbers for referencing said stroke shape patterns of target characters and said stroke position patterns of target characters respectively, each of said target characters having one or more strokes, each said stroke consisting of one said stroke shape pattern and one said stroke position pattern; and a matching unit calculating a set of inter-character distances for said inputted character, each of said set of inter-character distances representing a difference between said inputted character and said plurality of target characters;

wherein said matching unit uses said set of inter-stroke shape distances and said set of inter-stroke position distances according to said character code identifiers to calculate said set of inter-character distances; and wherein said matching unit selects a matched character, as said recognition result, from said plurality of target characters, said matched character corresponding to the smallest of said set of inter-character distances.

10. The device according to claim 9 further comprising:

an inter-stroke distance calculator calculating a set of inter-stroke distances for said inputted character;

an inter-stroke distance table for storing said set of inter-stroke distances; and a stroke dictionary comprising a plurality of stroke code identifiers, said stroke code identifiers representing a plurality of target characters and corresponding to said inter-stroke distances stored in said inter-stroke distance table;

wherein said inter-stroke distance calculator refers to said stroke dictionary, said stroke shape distance table, and said stroke position distance table prior to calculating said set of inter-stroke distances;

wherein said matching unit uses said set of inter-stroke distances according to said character code identifiers to calculate said set of inter-character distances; and wherein said matching unit selects a matched character, as said recognition result, from said plurality of target characters, said matched character corresponding to the smallest of said set of inter-character distances.

11. The device according to claim 10, wherein said inter-stroke distances are calculated as the sum of the inter-stroke shape distances and the inter-stroke position distances corresponding to said stroke code identifiers.

* * * * *

UNITED STATES PATENT AND TRADEMARK OFFICE
CERTIFICATE OF CORRECTION

PATENT NO. : 6,175,651 B1
DATED : January 16, 2001
INVENTOR(S) : Yoshikazu Ikebata, Kazunaga Yoshida, Yutaka Nakashima It is certified that error appears in the above-identified patent and that said Letters Patent is hereby corrected as shown below:

Column 4,
Line 40, Equation 1, delete "$\frac{1}{I}\sum_{i=1}^{I}$" insert -- $\frac{1}{I}\sum_{i=1}^{I}$ --

Column 7,
Line 22, Equation 6, delete "$\sum_{i=1}^{I}$" insert -- $\sum_{i=I}^{I}$ --

Signed and Sealed this

Twelfth Day of February, 2002

Attest:

JAMES E. ROGAN
Attesting Officer    Director of the United States Patent and Trademark Office